United States Patent [19]

Carlson et al.

[11] Patent Number: 4,773,497

[45] Date of Patent: Sep. 27, 1988

[54] FLOATING BALL-NUT FOR AN ELECTRIC ASSIST STEERING SYSTEM

[75] Inventors: Robert E. Carlson, Livonia; Joseph S. Clement, Warren, both of Mich.

[73] Assignee: TRW Inc., Lyndhurst, Ohio

[21] Appl. No.: 17,562

[22] Filed: Feb. 24, 1987

Related U.S. Application Data

[63] Continuation of Ser. No. 861,054, May 8, 1986, Pat. No. 4,660,014.

[51] Int. Cl.⁴ .......................... B62D 3/08; F16H 1/84
[52] U.S. Cl. ................................. 180/79.1; 180/148; 74/424.8 R; 318/616
[58] Field of Search ............... 180/148, 79.1; 384/611, 384/612, 616; 74/424.8 R, 459, 216.3, 89.15

[56] References Cited

U.S. PATENT DOCUMENTS

| | | | |
|---|---|---|---|
| 4,175,475 | 11/1979 | Eckhardt | 74/424.8 R |
| 4,186,615 | 2/1980 | Adams | 74/424.8 R |
| 4,415,054 | 11/1983 | Drutchas | 280/79.1 |
| 4,593,780 | 6/1986 | Sarto | 180/79.1 |
| 4,604,911 | 8/1986 | Teramachi | 74/424.8 R |
| 4,619,155 | 10/1986 | Futaba | 180/148 |

FOREIGN PATENT DOCUMENTS 0148664 7/1985 European Pat. Off. .
60-15495 5/1985 Japan .................................. 180/79.1

OTHER PUBLICATIONS

European Search Report EP 87 10 0907.

Primary Examiner—John J. Love
Assistant Examiner—Donn McGiehan
Attorney, Agent, or Firm—Tarolli, Sundheim & Covell

[57] ABSTRACT

An improved mounting arrangement for a ball nut drive assembly for a linear actuator is disclosed. The invention is described as embodied in an electric assist steering system. The steering system includes a housing surrounding at least a portion of a steering member having rack teeth thereon, a ball-nut drive assembly circumscribing a thread portion of the steering member for axially driving said steering member upon rotation of the ball-nut drive assembly, an electric assist motor for driving said ball-nut assembly into rotation in response to a control signal and an electronic control unit for providing said control signal in response to a measured amount of driver input torque. The steering member is radially supported relative to the housing at two spaced apart locations. The ball-nut drive assembly is axially spaced from the electric assist motor and connected thereto by a connection tube. Thrust bearings are located at each end of the ball-nut drive assembly and are operatively positioned between the ball-nut drive assembly and the housing. Each thrust bearing has an associated O-ring positioned between such thrust bearing and the housing. The thrust bearings and O-rings substantially restrain axial movement of the ball-nut drive assembly relative to the housing and enable radial movement of the ball-nut assembly relative to the housing.

5 Claims, 2 Drawing Sheets

FLOATING BALL-NUT FOR AN ELECTRIC ASSIST STEERING SYSTEM

CROSS REFERENCE TO RELATED APPLICATION

This is a continuation of copending patent application, Ser. No. 861,054, filed May 8, 1986, now U.S. Pat. No. 4,666,014.

TECHNICAL FIELD

The present invention relates to a linear actuator and is particularly directed to an improved ball-nut mounting arrangement. steering system and particularly relates to an improved ball-nut mounting arrangement for a power assist steering system.

BACKGROUND ART

The subject invention is described herein with regard to its use in an electric power assist steering system. Its use, however, is applicable in any linear actuator device.

There are many known power assist steering systems for automotive vehicles. Some systems provide assist by using hydraulic power, electric power or a combination thereof.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. the electric motor in such systems is typically controlled in response to (i) a driver's input torque applied to the vehicle steering wheel and/or (ii) vehicle speed.

U.S. Pat. No. 4,415,054, utilizes an electric assist motor having a rotatable armature drivingly connected to a ball-nut assembly which encircles a thread portion of a steering member having rack teeth thereon. The steering member is steerably connected to the vehicle's dirigible wheels. The rotary electric motor is energized in response to torque applied to the steering wheel. The ball-nut assembly converts rotary motion of the electric assist motor armature into linear movement of the steering member which, in turn, assists in steering the vehicle.

Known electric assist steering systems having a ball-nut drive assembly surrounding a steering member and driven by an electric motor have included a power assist steering assembly housing with a steering member and ball-nut assembly radially supported relative to the housing at four locations. The steering member is axially movable relative to the housing and the ball-nut assembly is both axially and radially fixed relative to the housing. When the ball-nut assembly is held radially fixed relative to the housing, assembly of the steering gear parts is difficult and requires extreme manufacturing tolerances to insure proper alignment of parts and efficient operation of the ball-nut assembly.

Also, in such known power assist steering systems having four radial supports for the steering member and the ball-nut assembly, loading of the steering member during use results in bending of the steering member which, in turn, exerts a radially outward force against the ball-nut assembly. Since the ball-nut assembly is radially fixed relative to the steering housing in previous designs, the ball-nut assembly could operate in an undesirable and inefficient manner when under such a radially exerted force.

An object of the present invention is to provide a linear actuator having a ball-nut drive assembly that permits easy alignment of the actuator parts without resorting to extreme manufacturing tolerance control. The present invention is to further provide a linear actuator having a ball-nut drive assembly that is mounted so as to restrict axially movement relative to the housing while enabling limited radial movement of the ball-nut drive assembly to accommodate radial movement of linear moving shaft of the actuator thereby insuring proper and efficient operation of the ball-nut drive assembly.

SUMMARY OF THE INVENTION

The present invention is directed to an improved ball-nut drive assembly mounting arrangement for a linear actuator. The present invention is described herein as it is embodied in a power assist steering system. It is to be understood that the invention is applicable to any system or assembly that uses a linear actuator and its use is not limited to power assist steering systems.

A power assist steering system, in accordance with the present invention, includes a pinion gear operatively connected to a steering wheel and in meshing engagement with rack teeth disposed on a steering member, an electric power assist motor, and a ball-nut drive assembly circumscribing a thread portion of the steering member and drivingly connected to the electric assist motor. The ball-nut drive assembly converts rotary motion of the electric assist motor to linear motion of the steering member. Bearing means restrains axial movement of the ball-nut drive assembly relative to the housing while enabling radial movement of the ball-nut drive assembly relative to the housing.

An assembly for turning the steerable wheels of a vehicle upon manual rotation of a steering wheel comprises a steering member which is axially movable to effect turning movement of steerable vehicle wheels, a housing surrounding at least a portion of the steering member, first bearing means for supporting at spaced apart locations the steering member for axial movement relative to the housing, an electric assist motor, ball-nut drive means for moving the steering member axially, the ball-nut drive means being drivingly connected to a thread portion of the steering member and drivingly connected to the electric assist motor, and second bearing means for restraining axial movement of the ball-nut drive means relative to the housing and for enabling radial movement of the ball-nut drive means relative to the housing.

In a preferred embodiment, a pinion gear is rotatably mounted in the housing, mechanically coupled to the steering wheel and meshingly engaged with rack teeth disposed on the steering member. A bearing yoke is mounted in the housing which in combination with the pinion gear radially supports the steering member at a first location. A second bearing support is located at a second location in the housing spaced from the first support location for radially supporting said steering member relative to the housing at a second location. The assembly further comprises an electric power assist motor drivingly connected to an axially spaced ball-nut drive means which circumscribes a thread portion of the steering member. The ball-nut drive means converts rotary motion of the electric assist motor into linear motion to axially drive the steering member. Thrust bearing means are located at the ends of the ball-nut drive means between the ball-nut drive means and the housing. The thrust bearing means include means for restraining the ball-nut drive means axially relative to the housing and for enabling the ball-nut drive means to move radially relative to the housing upon radial movement of the steering member.

Side loading adjustment means are provided effective between the housing and the thrust bearing means for varying the amount of side loading against the thrust bearing means. Impedance to radial movement of the ball-nut drive means varies with varying side loading of the thrust bearing means.

An axial spline connection is provided between the armature of the electric assist motor and the ball-nut drive means to permit relative axial movement therebetween.

DESCRIPTION OF THE DRAWINGS

Other features and advantages of the invention will be apparent to those skilled in the art by reference to the following detailed description taken in connection with the accompanying drawings wherein.

BEST MODE FOR CARRYING OUT THE INVENTION

Figure 1:
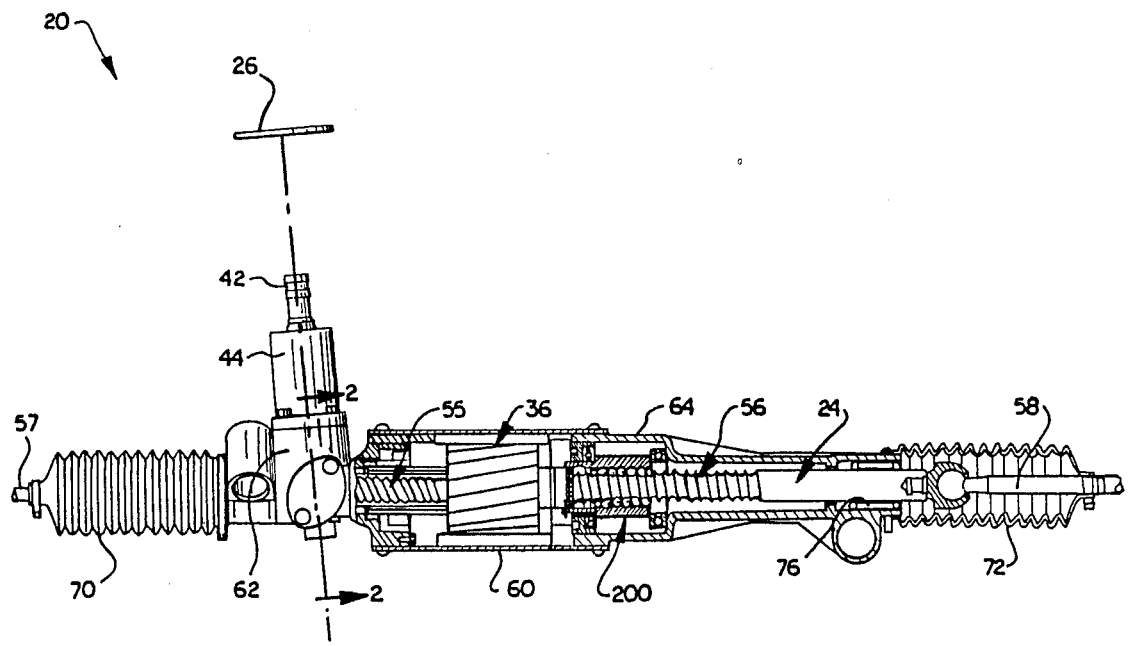
FIG. 1 is a plan view partially in section of a power assist steering system in accordance with the present invention.
Figure 2:
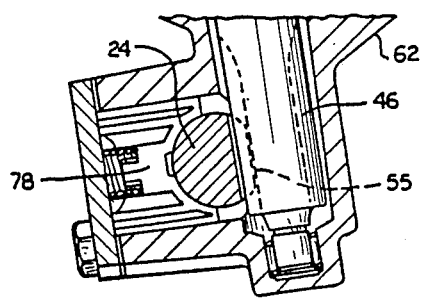
FIG. 2 is a sectional view taken along line 2—2 of FIG. 1.
Figure 3:
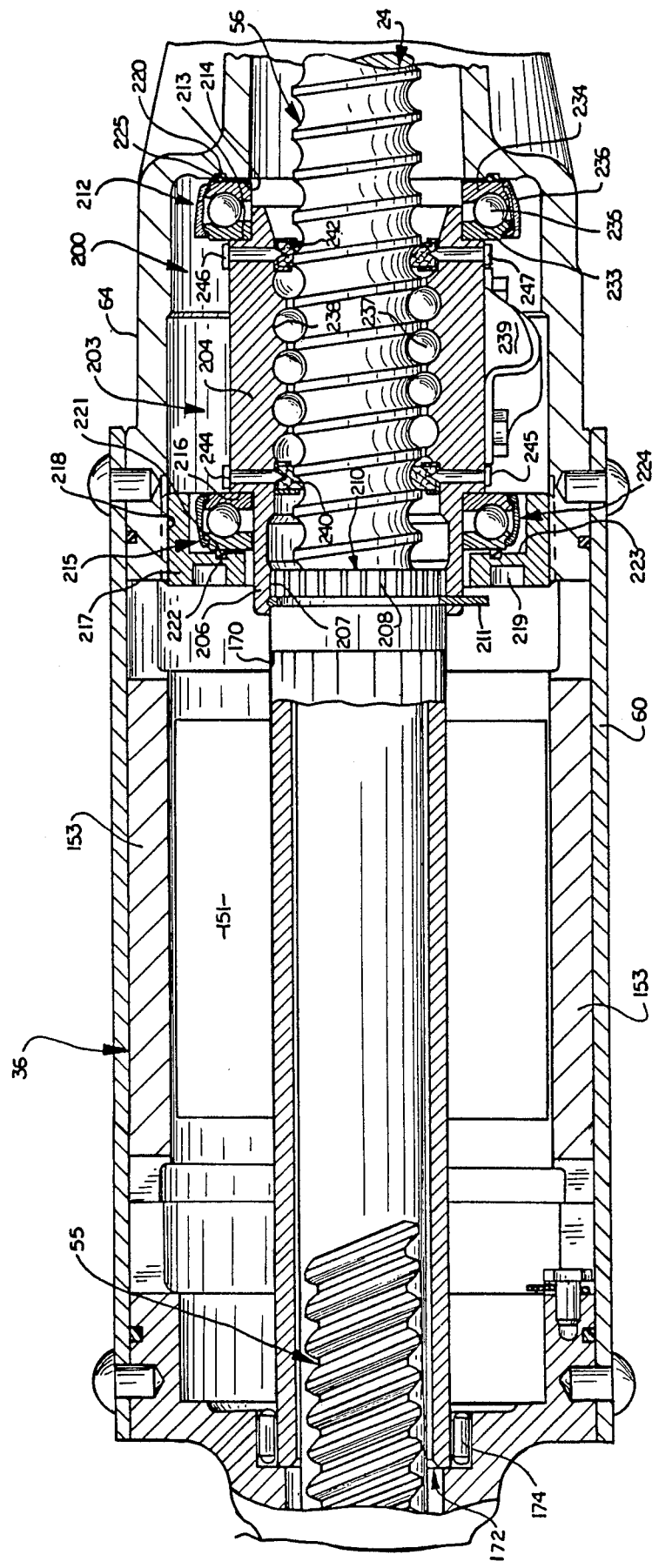
FIG. 3 is a fragmentary sectional view of a portion of FIG. 1 on an enlarged scale showing a ball-nut mounting arrangement in accordance with the present invention.

The present invention is directed to a new and improved mounting arrangement for a ball-nut of a linear actuator. For the purpose of explanation only, the invention is described as being embodied in a power assist steering system. The invention is not limited to such an application.

Referring to the drawings, a power assist steering system 20 includes a driver-operated steering wheel 26 operatively connected to a steering member 24. The steering member 24 is in force transmitting engagement with the steerable or dirigible wheels (not shown) of a vehicle.

Specifically, the vehicle steering wheel 26 is operatively connected to an input shaft 42 which extends into a pinion tower 44 and is mechanically coupled to a pinion gear 46.

The steering member 24 includes a first portion having rack teeth 55 disposed thereon and a second portion having an external thread convolution 56 disposed thereon axially spaced from the rack teeth 55. The pinion gear 46 includes gear teeth that meshingly engage the rack teeth 55. The steering member 24 is operatively connected to steerable wheels of the vehicle through tie rods 57, 58.

When steering torque is applied to the steering wheel 26, power assist is provided by an electric assist motor 36 drivably connected to a ball-nut assembly 200 which is in turn drivably connected to the steering member 24. A detailed description of use of an electric motor driven ball-nut assembly to provide power assist steering is found in U.S. Pat. No. 4,415,054 to Drutchas and is hereby fully incorporated herein by reference.

A motor housing 60 partially surrounds the steering member 24 and is bolted, at one end, to a pinion housing 62. The pinion tower 44 is bolted to the pinion housing 62. An outboard housing 64 is bolted to the other end of the motor housing 60. Tie rods 57, 58 are connected at opposite ends of the steering member 24. Dust boots 70, 72 are respectively connected to the tie rod 57 and the pinion housing 62 and to the tie rod 58 and outboard housing 64 to prevent environmental contaminants from entering the steering system. The steering member 24 is radially supported within the outboard housing 64 by bearing 76 and within the pinion housing 62 by a bearing yoke 58 in combination with the pinion gear 46.

The electric power assist motor 36 is located within the motor housing 60 and surrounds the steering member 24. The electric motor 36 includes an armature 151 surrounded by four spaced apart permanent magnets 153 secured to the interior of the motor housing 60.

A connection tube 170 is connected to and extends axially outward of the armature 151 and is rotatably supported at one end 172 by bearings 174. When the electric power assist motor 36 is energized, the armature 151, and the connection tube 170, rotate about the steering member 24 as the magnets 153 remain stationary in the housing 60.

A ball-nut drive assembly 200 drivingly engages the thread portion 56 of the steering member 24. The ball-nut drive assembly 200 includes a generally cylindrical, rotatable nut member 203 havin a main body portion 204 and a reduced diameter extension portion 206. An inner wall surface 207 of extension portion 206 has inwardly directed splines that are drivingly engaged by radial projecting splines 208 located at an end 210 of the connection tube 170. A clip 211 defines an axil limit of travel between the tube 170 and the nut 203. As the armature 151 and connection tube 170 rotate upon energization of the motor 36, the nut 203 is driven in rotation therewith.

A thrust bearing 212 is positioned between one end 213 of main body portion 204 of the nut 203 and an interior surface 214 of the outboard housing 64. A thrust bearing 215 is positioned between the other end 216 of main body portion 204 and recess portion 224 of a spanner nut 217. The spanner nut 217 is threadably received into a threaded portion 218 of the interior surface of the outboard housing 64. Lug recesses 219 of the spanner nut 217 are used to screw the spanner nut in place. The spanner nut 217 adjustably side loads the ball-nut drive assembly 200.

An O-ring 225 is held in an annular groove 220 in the interior wall 214 of the outboard housing 64 and contacts the thrust bearing 212. Another O-ring 221 is held in an annular groove 222 in the interior wall 223 of the recess portion 224 of the spanner nut 217. O-ring 221 contacts the thrust bearing 215. Each thrust bearing 212, 215 includes two annular races 233 and 234. A plurality of balls 235 are confined between the races. A closure cup 236 holds the two races 233, 234 together.

The ball-nut assembly 200 includes a plurality of balls 237 which provide mechanical coupling between an interior threaded portion 238 of the main body portion 204 and the thread portion 56 of the steering member 24. A recirculation tube 239 recirculates the balls 237 during rotation of the nut 203. As the motor 36 drives the connection tube 170 and thus the nut 203 into rotation, the balls 237 force the steering member 24 to move linearly. The ball-nut drive assembly 200 thus acts as a gear box which converts rotary motion of the electric assist motor 36 into linear motion of the steering member 24.

Annular, felt wipers 240, 242 are respectively positioned at opposed ends of the main body portion 204 of the nut 203 to prevent dirt from entering the ball-nut drive assembly 200. Pins 244, 245 and pins 246, 247 respectively hold the felt wipers 240, 242 in an axially fixed position relative to the main body portion 204 of the nut 203.

The steering member 24 is supported relative to the housings 60, 62, 64 only by the bearing 76 and the yoke-pinion 78, 46 combination in the pinion housing 62. The ball-nut drive assembly 200 is substantially axially restrained relative to the housings, but can "float" with radial movement of the steering member 24. The thrust bearings enables the relative radial movement.

The connection tube 170 is supported at one end 210 by the ball-nut drive assembly 200 and pivotally supported at its other end 172 by bearings 174. If the steering member 24 radially moves relative to the housings 60, 62 and 64, the connection tube 170 will move at its one end 210 with the ball-nut 203 and pivot at its other end 172.

During use, the steering member 24 may bend slightly under load between its two supports, bearing 76 and the yoke-pinion 78, 46 combination in the pinion housing 62, causing radial displacement of the steering member 24 at the location of the nut 203. Under such a condition, the ball-nut drive assembly 200 floats as the steering member 24 bends thereby insuring proper and efficient operation of the ball-nut drive assembly 200.

Also, if the ball-nut drive assembly 200 was radially fixed relative to the housings 60, 62, 64, it would be necessary to have extreme manufacturing tolerances to insure exact alignment between the bearing 76, the ball-nut drive assembly 200 and the yoke-pinion 78, 46 combination. If exact alignment was not sufficiently achieved, assembly would be difficult or impossible and inefficient operation of the ball-nut drive assembly 200 could occur. The float mounting arrangement of the ball-nut drive assembly 200 using thurst bearings 212, 215 described above, relieves the tolerance problem by enabling the ball-nut drive assembly 200 to commensurately move with any radial movement of the steering member 24 thereby facilitating assembly and proper and efficient operation of the ball-nut drive assembly 200.

The O-rings 221, 225 serve three purposes. First, they attenuate noise during operation of the electric assist system. Second, they provide impedance to radial movement of the nut 203. Third, they restrict axial movement of the nut 203. The spnner nut 217 is tightened an amount to sufficiently restrain the nut 203 axially. The O-rings provide a certain degree of impedance to radial movement, the amount varying with the amount of side loading from the spanner nut 217. The O-rings are made from an elastomeric material that permit a minute amount of axial movement of the nut 203 since they can be compressed during operation by a dimension greater than the amount resulting from the side loading by the spanner nut 217. Whenever the nut 203 is rotated in one direction or the other, the nut moves axially a slight amount resulting from the forces needed to move the steering member 24.

It is contemplated that the O-rings 221, 225 can be replaced with wave or spring washers; one positioned between the thrust bearing 212 and the housing 64 and one positioned between the thrust bearing 215 and the spanner nut 217.

This invention has been described with reference to perferred embodiments. Modifications and alterations may occur to others upon reading and understanding this specification. It is our intention to include all such modifications and alterations insofar as they come within the scope of the appended claims or their equivalent thereof.

Having described preferred embodiments of the invention, the following is claimed:

1. A linear actuator comprising:
   a housing;
   a member disposed within at least a portion of said housing, said member being axially movable relative to said housing and having a thread portion;
   first bearing means for supporting at spaced apart locations said member for said axial movement relative to said housing;
   a rotary drive means;
   ball-nut drive means positioned between said spaced apart locations and operatively drivable in rotation by said rotary drive means and drivingly connected to said thread portion of said member, said ball-nut drive means, when driven in rotation, moving said member axially relative to said housing;
   second bearing means between said housing and said ball-nut drive means for enabling radial movement of said ball-nut drive means relative to said housing; and
   at least one elastically deformable member positioned between said second bearing means and said housing for permitting limited axial movement of said ball-nut drive means relative to said housing.

2. The actuator of claim 1 wherein said radial movement of said ball-nut drive means is impeded by said at least one elastically deformable member.

3. The actuator of claim 1 wherein said rotary drive means is an electric motor having an armature and said actuator further includes spline connection means between said armature and said ball-nut drive means for permitting relative radial movement between said armature and said ball-nut drive means.

4. The assembly of claim 1 wherein said second bearing means includes a thrust bearing at each axial end of said ball-nut drive means.

5. The assembly of claim 1 further including side loading adjustment means effective between said housing and said second bearing means for varying the amount of axial loading against said second bearing means, impedance to radial movement of said ball-nut drive means varying with varying axial loading of said second bearing means.

* * * * *